(12) United States Patent
Koonen

(10) Patent No.: US 6,674,966 B1
(45) Date of Patent: *Jan. 6, 2004

(54) RE-CONFIGURABLE FIBRE WIRELESS NETWORK

(75) Inventor: Antonius Marcellus Jozef Koonen, Eemnes (NL)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/416,470

(22) Filed: Oct. 12, 1999

(30) Foreign Application Priority Data

Oct. 15, 1998 (EP) .............................................. 98308430

(51) Int. Cl.[7] ................................................. H04J 14/00
(52) U.S. Cl. ......................... 398/70; 398/115; 398/111; 398/113; 398/46; 398/49; 398/79; 398/82; 398/100; 398/68; 398/69; 398/71; 455/561; 455/422; 455/524; 455/562; 455/443; 370/328; 370/318; 370/342
(58) Field of Search .......................... 398/70, 115, 116, 398/111, 113, 79, 82, 100, 49, 46, 68, 69, 71; 455/561, 422, 524, 562, 443; 370/328, 318, 342

(56) References Cited

U.S. PATENT DOCUMENTS

| | | | | | |
|---|---|---|---|---|---|
| 5,424,864 | A | * | 6/1995 | Emura ......................... | 359/173 |
| 5,682,256 | A | * | 10/1997 | Motley et al. ............... | 359/117 |
| 5,793,507 | A | * | 8/1998 | Giles et al. .................. | 359/125 |
| 5,838,474 | A | * | 11/1998 | Stilling ........................ | 359/173 |
| 5,936,754 | A | * | 8/1999 | Ariyavisitakul et al. .... | 359/145 |
| 5,969,837 | A | * | 10/1999 | Farber et al. ................ | 359/132 |
| 5,978,117 | A | * | 11/1999 | Koonen ....................... | 359/125 |
| 5,978,119 | A | * | 11/1999 | Giles et al. .................. | 359/132 |
| 6,058,317 | A | * | 5/2000 | Posti ........................... | 455/561 |
| 6,069,721 | A | * | 5/2000 | Oh et al. ..................... | 359/145 |
| 6,097,517 | A | * | 8/2000 | Okayama .................... | 359/124 |
| 6,128,496 | A | * | 10/2000 | Scheinert .................... | 455/446 |
| 6,195,566 | B1 | * | 2/2001 | Kanai .......................... | 455/562 |
| 6,298,219 | B1 | * | 10/2001 | Patronen et al. ............ | 455/422 |
| 6,370,127 | B1 | * | 4/2002 | Daraiseh et al. ............ | 370/328 |

FOREIGN PATENT DOCUMENTS

| | | | | |
|---|---|---|---|---|
| EP | 0 368 673 A1 | 11/1989 | ............ | H04Q/7/04 |
| EP | 0 538 635 A2 | 9/1992 | ............ | H04B/7/26 |

OTHER PUBLICATIONS

Kawamura, H. et al "High-Speed Data Transmission Using Millimeter-Wave Fiber-Optic Links" IEICE Transactions On Communications vol. E79-B No. 11, Nov. 1996, pp. 1784-1791.

Kitayama, K. "Highly Spectrum Efficient OFDM/PDM Wireless Networks By Using Optical SSB Modulation" Journal of Lightwave Technology, vol. 16, No. 6, Jun. 1998, pp. 969-976.

European Search Report dated Mar. 8, 1999.

* cited by examiner

*Primary Examiner*—Leslie Pascal
*Assistant Examiner*—Hanh Phan

(57) ABSTRACT

A wireless communication system comprises a base station controller and a base station interface connected to the base station controller by a central optical fiber. The base station interface may include a flexible wavelength router. At least one base station is connected to the base station interface, and the central optical fiber carries at least one communication channel associated with an optical signal having one of a plurality of wavelengths. The base station interface selectively provides a communication path between the base station controller and at least one base station using at least one communication channel.

8 Claims, 10 Drawing Sheets

RE-CONFIGURABLE FIBRE WIRELESS NETWORK

FIELD OF THE INVENTION

The present invention relates to a wireless communication network having a reconfigurable infrastructure, and particularly to such a network in which communication channels are provided to distributed base stations via optical fiber cables.

BACKGROUND TO THE INVENTION

In wireless communication systems traffic densities in a particular area are not constant. Wireless networks are usually laid out as a set of cells, which provide coverage of a larger region. At certain times, traffic increases in certain cells, providing so-called 'hot-spots'. If hot-spots occur in the network, traffic demand may exceed the network capacity available (in the microwave carrier available in that cell, and/or in the network feeding the wireless base station which supports the microwave antenna in that cell), leading to rejection of calls.

Current wireless systems are divided into cells. Each cell uses one or more dedicated carrier frequencies, with each carrier frequency carrying a limited number of voice or data connections. The carrier frequencies available in a wireless network are usually assigned amongst the cells in such a way that adjacent cells use different frequencies, in order to avoid interference problems. A common network structure consists of hexagonal cells with the transmit/receive antenna at the base station in the middle, arranged in a cluster containing seven cells. Each of the seven cells operate at different carrier frequencies. By repeating this cell structure a large geographical area can be covered. However, this fixed configuration is not responsive to changing traffic densities.

Reconfigurable wireless networks have been proposed to provide communication systems which are responsive to traffic densities. Where traffic density is expected to be dense, cells can be partitioned into smaller micro-cells, each having their own antenna and the flexibility to assign one or more carrier frequencies per micro-cell as needed.

The benefits of partitioning each of the 'macro-cells' cells into seven (hexagonal) micro-cells surface when extra capacity is needed suddenly at certain locations in the network. At hot-spots (i.e. micro-cells where traffic density is high) one or more additional carrier frequencies may be applied. The whole network may be partitioned into micro-cells when the traffic is intense all over the region. In the case of a hot-spot in the network, the micro-cells may be arranged such that the full capacity of one or more carrier frequencies is offered to the hot-spot micro-cell, leaving the surrounding cells at a less intense coverage as appropriate. In the opposite situation, it is appropriate to restructure the cells such that capacity is shifted from a 'cold-spot' (i.e. where traffic density is low) to surrounding cells. Thus several cold-spot micro-cells may share the same carrier frequency.

The partitioning of the original networks cells into micro-cells may also be implemented by segmenting the cells or micro-cells into a multitude of parts or segments by using a multi-sector antenna (instead of an omni-directionally radiating one). The advantage of this is that no new antenna pole locations need to be acquired; the omni-directionally antenna on the pole has to be replaced by a multi-sector one. Similarly, as described before the cells in a network may be segmented as needed. Also, in a particular segment, multiple carrier frequencies may be stacked. Multi-sector antennas to apply segmentation need to be activated only on those locations where hot-spots are to be expected.

The implementation of the feeder network for the above-described reconfigurable wireless network can be done by a passively split optical network (PON). In a PON, the optical signals in the feeder fiber coming from the head-end section are split among many drop fibers entering the so-called optical network units (ONUs) close to (or at) the base stations. By means of optical fibers, this splitting ratio may be increased up to a very high number.

U.S. patent application Ser. No. 08/920,716 filed Aug. 29, 1997 discloses a wireless communication system which is reconfigurable to accommodate varying traffic density by using a flexible optical interface between a base station controller and several base stations. A flexible optical interface is positioned at one or more of the base stations. Communication is provided over an optical fiber, and optical network units associated with each base station include control means for selecting the appropriate wavelengths from the optical fiber for use by that base station. The wavelength selection is provided in both the upstream and the downstream direction.

One drawback of this arrangement is that it is required to provide wavelength selection means in the optical network unit associated with each base station, which increases complexity, costs, maintenance and space requirements for each base station.

It is therefore an object of the present invention to provide a reconfigurable wireless network that minimizes the complexity of the base stations.

SUMMARY OF THE INVENTION

The present invention provides a wireless communication system comprising a base station controller and a base station interface connected to the base station controller by a central optical fiber. The base station interface may include a flexible wavelength router. At least one base station is connected to the base station interface, and the central optical fiber carries at least one communication channel associated with an optical signal having one of a plurality of wavelengths. The base station interface selectively provides a communication path between the base station controller and at least one base station using at least one communication channel.

The central optical fiber may carry a plurality of communication channels each associated with an optical signal having one of a plurality of wavelengths. The base station interface selectively provides a communication path between the base station controller and the base station using at least one of the plurality of communication channels.

A plurality of base stations may be connected to the base station interface. The base station interface selectively provides communication paths between the base station controller and selected ones of the plurality of base stations using the at least one communication channel.

The base station interface may provide communication paths between the base station controller and the plurality of base stations using the plurality of communication channels, where each communication path including one or more communication channels.

The present invention also provides a wireless communication system comprising a base station controller and a wavelength flexible router connected to the base station controller by a central optical fiber. A plurality of base stations are connected to the wavelength flexible router. The central optical fiber carries a plurality of communication channels each associated with an optical signal having one of a plurality of wavelengths. The wavelength flexible router selectively provides a communication path between the base station controller and at least one of the plurality of base stations using at least one communication channel, wherein at least some of the functionality associated with each base station is performed at the base station controller.

The functionality performed at the base station controller may include mobility-related functions, such as macro-diversity handling. The functionality performed at the base station controller may also include generating and receiving the analogue signals to and from the antenna.

The invention thus provides for the centralization of base station functions at the base station controller site, thus giving optically remote antenna sites.

DESCRIPTION OF PREFERRED EMBODIMENTS

Figure 1:
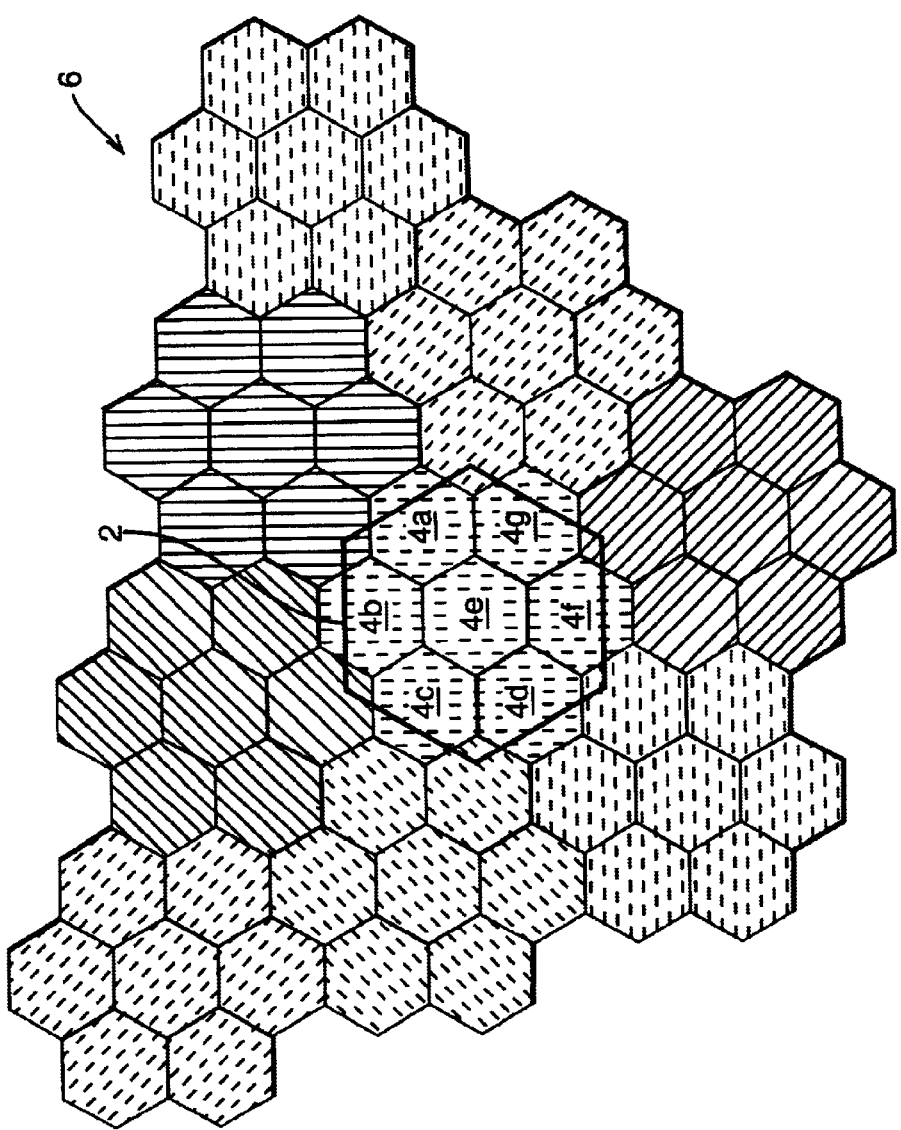
FIG. 1 illustrates schematically a portion of a cellular network divided into micro-cells using omni-directional antennas.

Referring to FIG. 1, there is illustrated a portion 6 of a cellular network. In the portion of the cellular network 6 shown in FIG. 1, the cells are split into micro-cells. For example, the micro-cells 4a to 4g are derived from the macro-cell 2 of a conventional cellular structure. In the portion of the cellular network illustrated in FIG. 1 it is assumed that each micro-cell is provided with an omni-directional antenna. Thus the cellular structure shown in FIG. 1 has evolved from a macro-cellular structure in which each macro-cell had a single omni-directional antenna, to a micro-cellular structure in which each macro-cell is replaced by seven micro-cells each having an omni-directional antenna.

Figure 2:
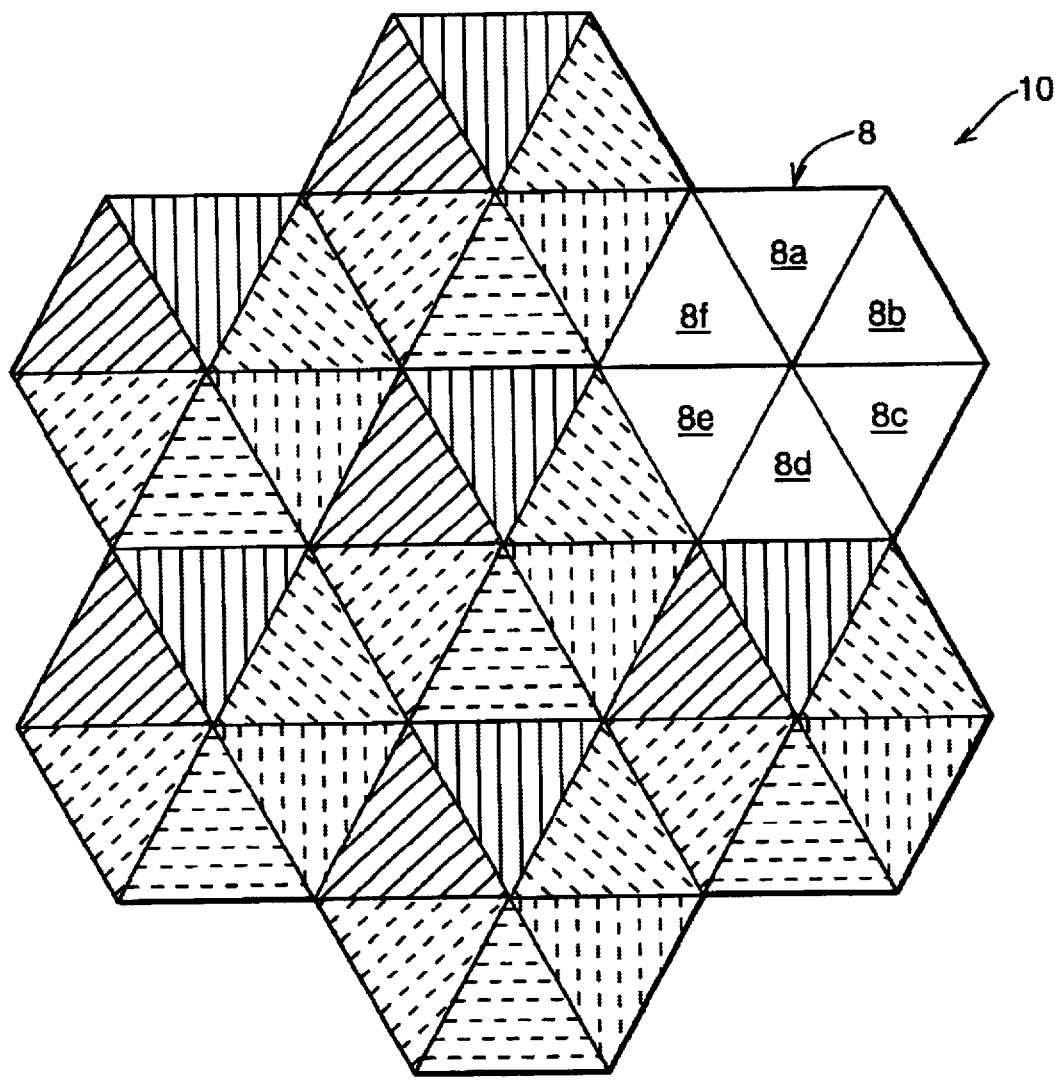
FIG. 2 illustrates a portion of a cellular network divided into micro-cells using multi-sector antennas.

FIG. 2 illustrates schematically the evolution from a macro-cellular structure to a micro-cellular structure using multi-sector antennas. The portion 10 of the cellular network shown in FIG. 2 has each macro-cell split into sectors: by employing a multi-sector antenna in each macro-cell. Thus, for example, one macro-cell 8 is split into six sectors 8a to 8f each effectively forming a micro-cell.

It will be appreciated that a cellular network may include a mixture of macro-cells and micro-cells depending upon envisaged need. The micro-cells may also be implemented in different ways, for example by a mixture of multi-sector antennas deployed in macro-cells and a plurality of omni-directional antennas employed in macro-cells.

Figure 3:
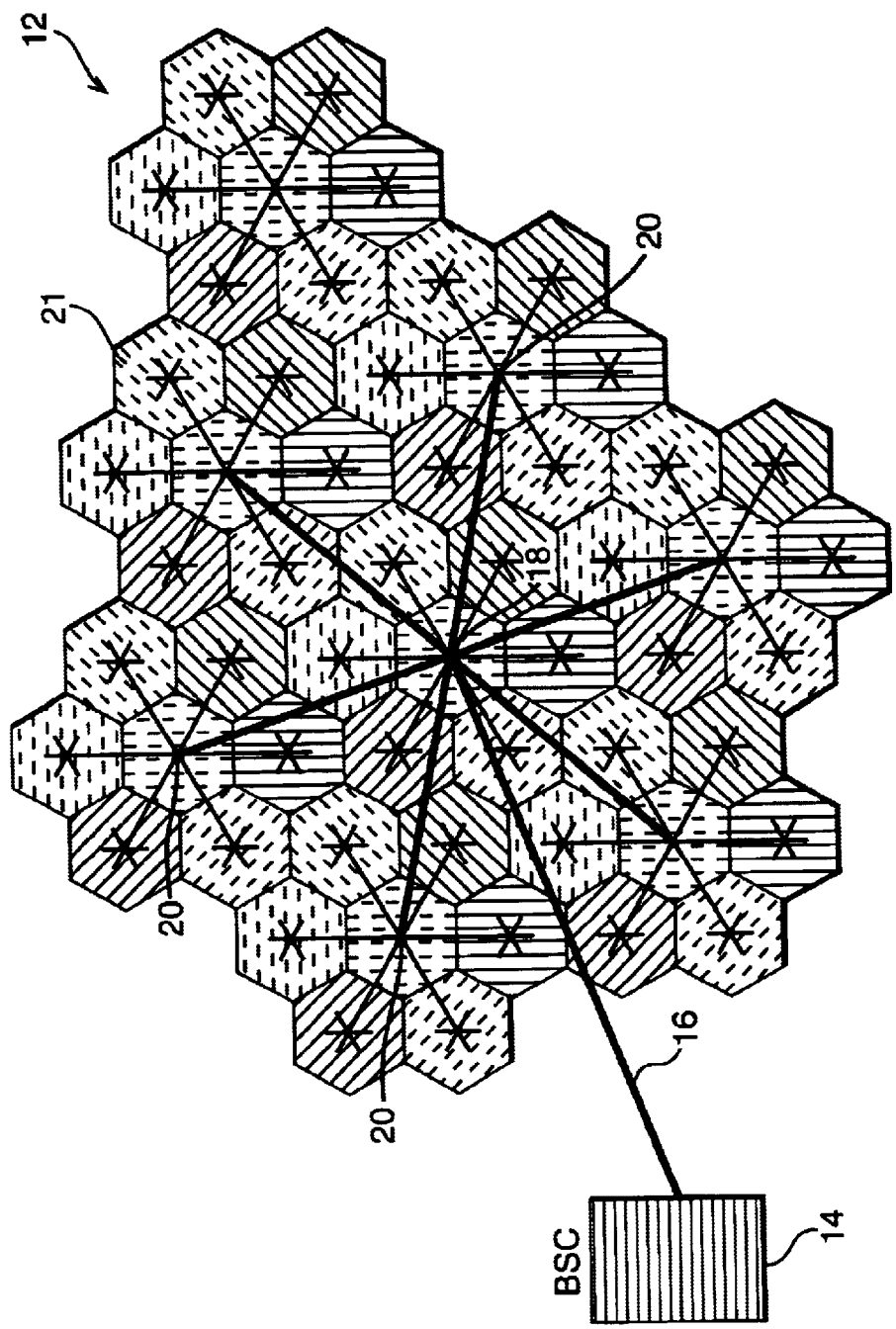
FIG. 3 illustrates schematically a portion of a cellular network fed by a passively split optical network.

The wiring of the micro-cells (being either the omni-directional antenna structure or the multi-sector antenna structure) can be done by a passively split optical network (PON). In a PON, the optical signals in the feeder fiber coming from the head-end station are split among many drop fibers entering so-called optical network units (ONUs) close to, or at, the base stations. By means of optical amplifiers, this splitting ratio may be increased up to a very high number. The PON technology is applied to a wireless application as shown in FIG. 3. The main fiber 16 coming from the base station controller (BSC) 14 runs into the heart 18 of the cluster of micro-cells 12. From there it is split to the hearts of the seven clusters 20 of each set of seven micro-cells, where it is split again among the individual antennas in the micro-cells 21. Likewise, more splitting stages may be added or omitted, while retaining this concept.

The original macro-cells of the structure shown in FIG. 3 were served by base transceiver stations (BTSs, i.e. base stations having transmit and receive capabilities) located at the center 20 of each seven-cell micro-cell structure. In creating the micro-cell structure each of those base transceiver stations is replaced by an optical splitter, and a base transceiver station provided at the center of each micro-cell. At the same time, the network can still support and maintain macro-cells retaining a single central base transceiver station.

Figure 4:
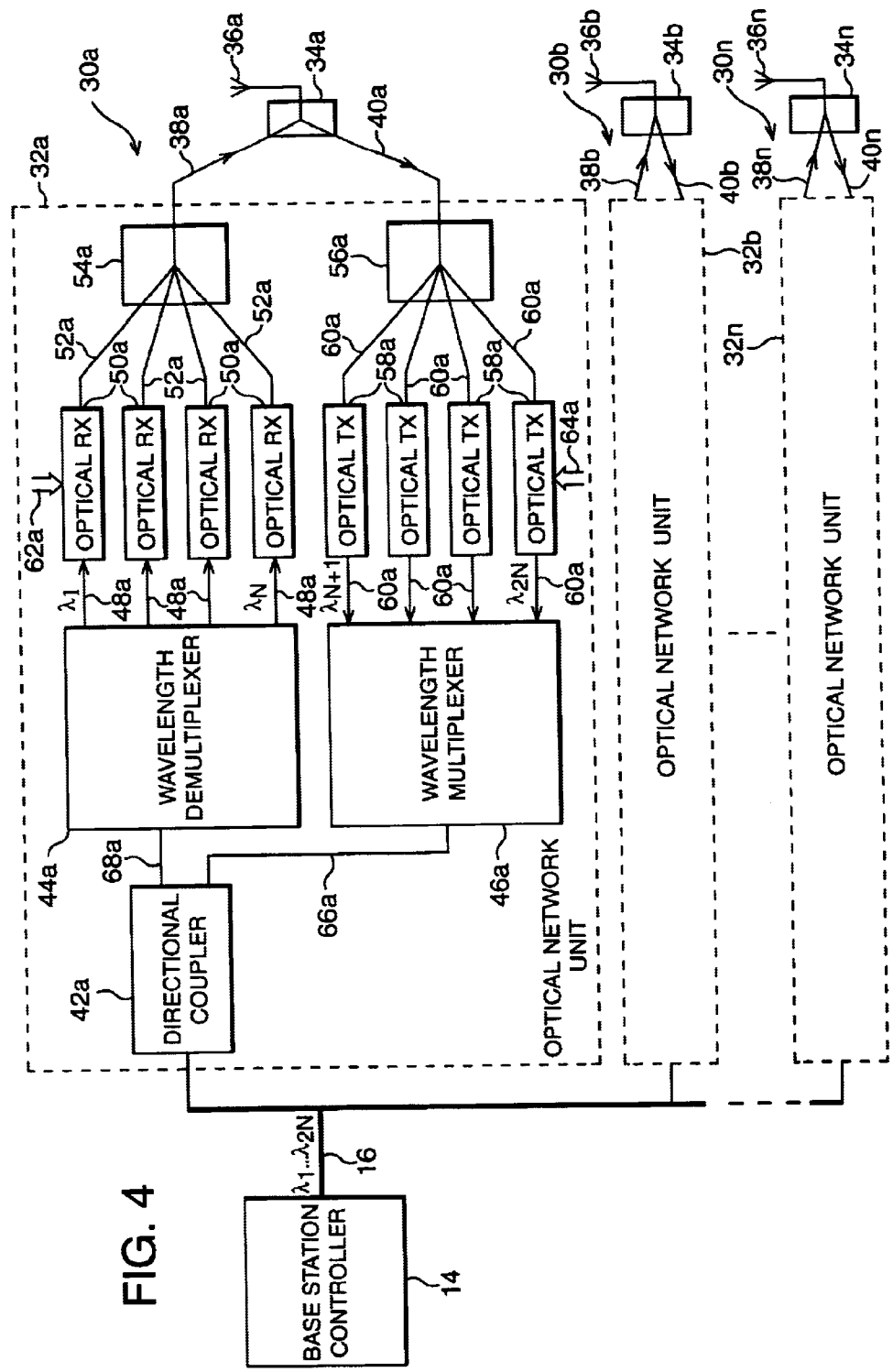
FIG. 4 illustrates a reconfigurable network (according to the previous invention, U.S. patent application Ser. No. 08/920,716 filed Aug. 29$^{th}$ 1997)

Referring to FIG. 4, there is shown a more detailed implementation of the system structure of FIG. 3 as described in U.S. Ser. No 08/920,716. FIG. 4 illustrates the base station controller (BSC) 14 connected to a plurality of base transceiver stations (BTSs), generally designated by reference numerals 30a, 30b and 30n, by the optical fiber 16. Each BTS 30a, 30b and 30n includes an optical network unit (ONU) 32a, 32b and 32n, a microwave directional coupler 34a, 34b and 34n, and an antenna 36a, 36b and 36n. The contents of each optical network unit are the same and therefore only illustrated in detail in FIG. 4 for the unit 32a. It will be appreciated that the units 32b and 32n will be constructed in a similar fashion.

The signals on optical fiber link 16 form an input to each of the ONUs 32a, 32b and 32n. Each ONU outputs a signal on its respective output line 38a, 38b and 38n to the respective ones of the microwave directional couplers 34a, 34b and 34n. Each of the ONUs receives a signal on its respective input line 40a, 40b, and 40n from the respective directional coupler 34a, 34b and 34n. The microwave directional couplers 34a, 34b and 34n interface with the one of the antennas 36a, 36b and 36n associated with the corresponding BTS.

Each optical network unit 32 comprises an optical fiber directional coupler 42, a wavelength demultiplexer 44, a wavelength multiplexer 46, a plurality of optical receivers 50, a plurality of optical transmitters 58, a microwave signal combiner 54, and a microwave signal splitter 56 The optical fiber 16 carries multiple wavelengths, which are used to feed the BTSs. The number of optical receivers 50 in each ONU corresponds to the number of possible downstream wavelengths. Similarly, the number of optical transmitters 58 in each ONU corresponds to the number of possible upstream wavelengths.

In each BTS the ONU terminating the fiber 16 and transferring the signals to and from the antenna 36a, 36b or 36n is able to select one or more of the wavelength channels for transmission to, or reception from, its antenna as described further below.

The operation of the system illustrated in FIG. 4 will now be described with reference to the optical network unit 32a.

In the downstream direction, the base station controller transmits wavelengths $\lambda_1$ to $\lambda_N$ to the ONUs on optical fiber 16. The optical fiber directional coupler 42a of the ONU 32a couples the optical signal received on the optical fiber 16 to the optical signal line 68a of the ONU. The wavelengths $\lambda_1$ to $\lambda_N$ on the optical signal line 68a are separated by a passive wavelength demultiplexer 42a, and each of the wavelengths $\lambda_1$ to $\lambda_N$ is then fed separately on a respective optical signal line 48a to a respective optical receiver 50a.

Each of the optical receivers 50 can be switched on or off under the control of control signals 62a. Thus the wavelength channel selection is realized. This on/off switching, i.e. generation of the control signals 62a, is done under remote control from, for example, the BSC using an optical, wired or wireless communications channel. One or more wavelengths may be selected thus giving the possibility of having a plurality of selected carrier frequencies arrive in the micro-cell. Thus selection of the wavelengths in the optical receivers 50a selects the number, and characteristics, of the wireless communication channels allocated to the BTS 30a. This gives the desired flexible micro-cell configuration.

In those optical receivers 50a that are switched on the output signals are put on the appropriate microwave carrier (s) and presented on signal lines 52a, and output to the signal combiner 54a. The outputs of the optical receivers 50a are electrical signals. The combined electrical signals output by the combiner 54a are then output on line 38a to the directional coupler 34a, which couples the received signals onto the antenna drive circuitry. The antenna drive circuitry prepares the signals for transmission by the antenna.

In the upstream direction a number of wavelengths $\lambda_{N+1}$ to $\lambda_{2N}$ can be selected for bringing the data from the BTS to the BSC. The upstream wavelengths are preferably different from the downstream wavelengths, in order to minimize problems with optical reflections in the fiber network.

The BTS receives signals via antenna 36a, which are coupled onto the signal line 40a by microwave directional coupler 34a after pre-amplification in the antenna drive circuitry. The electrical signals on line 40a are then presented to the signal splitter 56a and fed via lines 60a to the optical transmitters 59a, where the signals are transferred to the appropriate frequency band for transport upstream towards the BSC. By means of the control signals 64a, the transmitter 59a having the appropriate wavelength is switched on; thus the upstream signal is put on any one of the wavelengths $\lambda_{N+1}$ to $\lambda_{2N}$.

The individual optical transmitters 59a can be switched on or off under the control of the signals 64a. This gives the upstream flexible micro-cell configuration, governed by the operator, in such a way that the network usage is as efficient as possible. The selected upstream signals of different wavelengths are combined using wavelength multiplexer 46a, which receives the selected signals on lines 60a. The outputs of the optical transmitters are optical signals. The multiplexed optical signals are output on line 66a to the optical fiber directional coupler 42a, which couples the optical signals on lines 66a to the optical fiber 16, to communicate them to the BSC.

The wavelengths selected for reception at the ONU 32a can be set independently from the wavelengths for transmission. This means that the micro-cell network structure for the downstream direction (BSC towards BTS) can be set differently from the structure for the upstream direction. This offers operational advantages in case of highly asymmetric traffic offerings.

Additionally, the intelligence usually located in the base transceiver stations can be moved upwards to the BSC, thanks to the possibility of putting the analogue microwave signals, after appropriate electrical frequency up- and down-conversion, on optical wavelength channel(s) and transporting them in an analogue way along the fiber feeder network. The analogue microwave signals are usually exchanged between each base transceiver station and the co-located antenna. Thus the base transceiver station (BTS) functionality (previously co-located with the antennas) is shifted to the central base station controller (BSC) location. This eases the implementation of mobility functions (like macro-diversity and seamless handover) where BTSs have to communicate with each other.

This entails significant cost savings in the base transceiver stations, reduction of maintenance, and an increase in the ease of network operation. However, the flexibility thus introduced into the cellular network requires the introduction of some additional circuitry and functionality into each BTS. Each ONU associated with a BTS is required to include a plurality of optical receivers and transmitters which are switchable, the number required being equivalent to the number of wavelengths to be supported. The circuitry to control the switching of these receivers and transmitters must also be included in every BTS.

Figure 5:
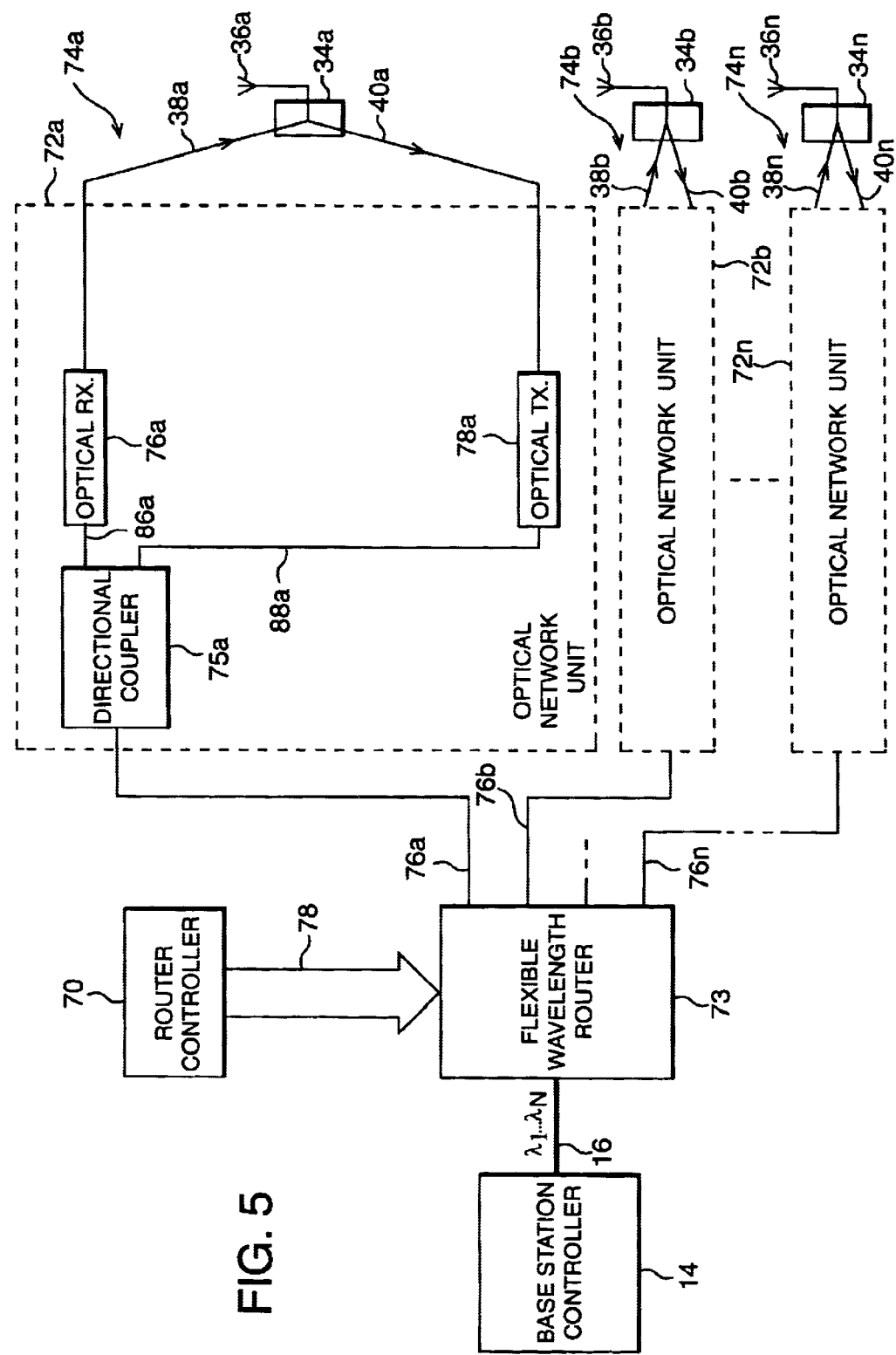
FIG. 5 illustrates a reconfigurable network according to the present invention.

Referring to FIG. 5, there is described an improved system in which all the advantages of the flexible micro-cell organization described with reference to FIG. 4 are retained, but additional performance and implementation improvements are obtained.

In FIG. 5, like reference numerals are used to designate elements corresponding to elements in FIG. 4. The base station controller 14 is connected to a flexible wavelength router 73 via the optical fiber 16. The flexible wavelength router is controlled by control signals 78 generated by a router controller 70. The flexible wavelength router 73 guides wavelength channels out of the set $\lambda_1$ to $\lambda_{2N}$ to one or more of the output ports 76a to 76n, corresponding to the number of base transceiver stations 74a to 74n.

The construction of the ONUs of the BTSs of FIG. 5 differ from the construction of the ONUs of the BTSs of FIG. 4. Referring to FIG. 5, each ONU 72a, 72b and 72n comprises an optical fiber directional coupler 75a, an optical receiver 76a, and an optical transmitter 78a. Each ONU generates signals on lines 38a, 38b and 38n to the respective microwave directional couplers 34a, 34b and 34n. Each ONU receives signals on lines 40a, 40b and 40n from the respective microwave directional couplers 34a, 34b and 34n.

Figure 6:
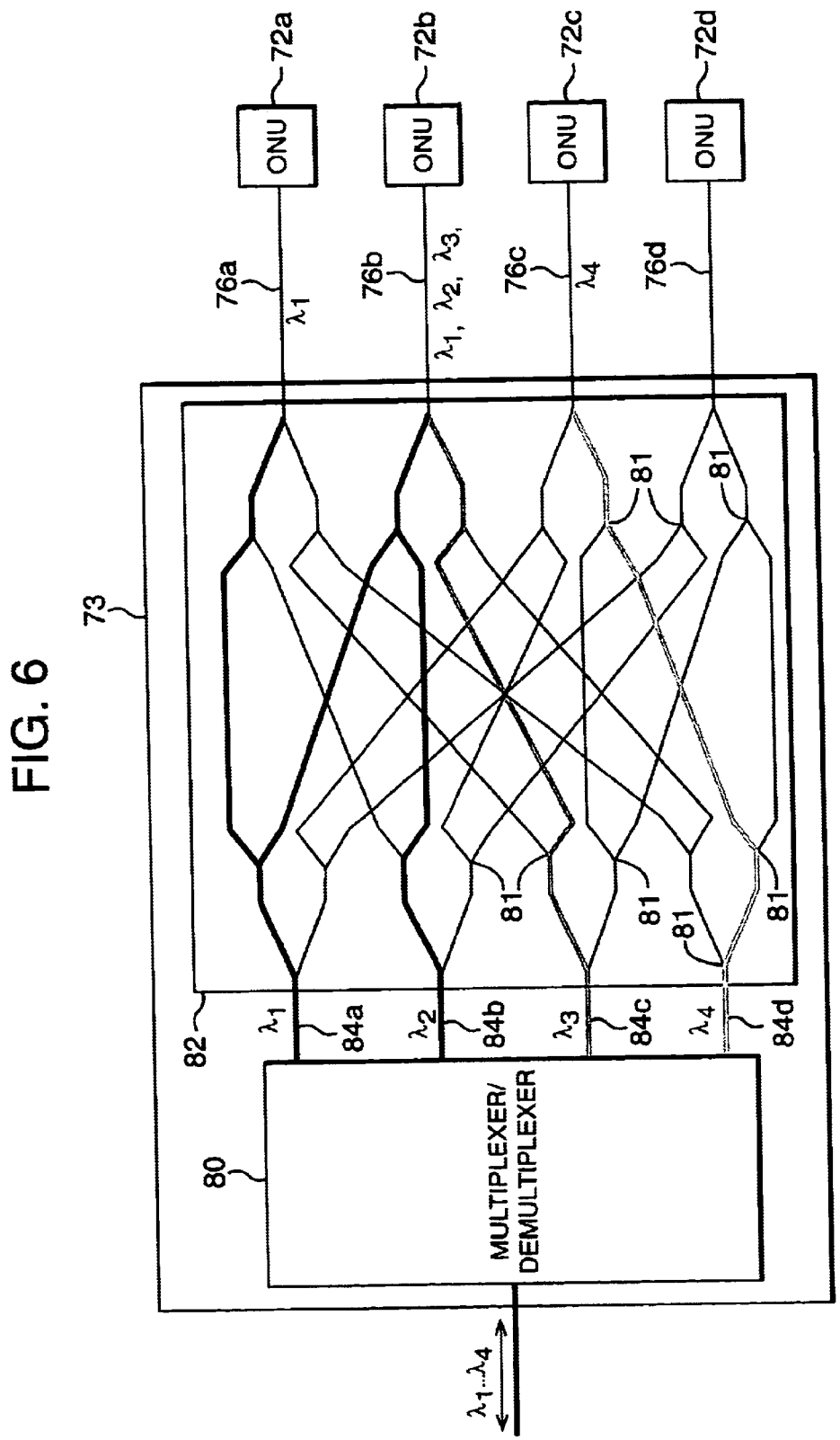
FIG. 6 illustrates an implementation example of the flexible wavelength router of the network of FIG. 5.

A more detailed view of a possible implementation of the flexible wavelength router 73 is shown in FIG. 6. The flexible wavelength router 73 comprises a multiplexer/demultiplexer 80 and a digital optical switch matrix 82. Each switch matrix element, some of which are referenced by numeral 81 in FIG. 6, is a 1-to-2 Y-branch switching device, which can be operated in three modes: guiding the light from the input port to the upper output port, to the lower output port, and to both ports (e.g., in the ideal case 50% of the input light into each output port). FIG. 6 illustrates a simplified example where the flexible wavelength router 73 has four outputs 76a, 76b, 76c, and 76d to connect to the ONUs 72a, 72b, 72c, and 72d of the four base transceiver stations.

The operation of the system according to the invention will now be described with reference to FIGS. 5 and 6, for an assumed implementation of four base transceiver stations and specifically with reference to the base transceiver station 74a.

As described in relation to FIG. 4, the optical fiber 16 carries a number of wavelengths $\lambda_1$ to $\lambda_N$, and in the specific example N=4. The wavelengths $\lambda_1$ to $\lambda_N$ form an input to the multiplexer/demultiplexer 80 of the flexible wavelength router. The multiplexer/demultiplexer 80 separates the wavelengths on the optical fiber 16 and outputs each one on a separate optical signal line 84, which form inputs to the digital optical switch 82. Thus in the example of FIG. 6 each of the four signal lines 84a to 84d carries an optical signal having a respective one of the wavelengths $\lambda_1$ to $\lambda_4$.

The flexible wavelength router 73 is controlled by the control signals 78 from the router controller 70 (which is preferably under remote control from the BSC, in a similar way as the controls 62a and 64a in FIG. 4) to route the wavelengths on the signal lines 84a to 84d to one or more of the outputs of the digital optical switch matrix 82. The digital optical switch matrix 82 has four outputs 76a to 76d connected to the respective ones of the four ONUs 72a to 72d. Thus any number of the wavelengths on the input lines 84a to 84d may be output on any one of the output lines 76a to 76d.

As can be seen, in FIG. 6 the digital optical switch matrix 82 is configured such that the wavelength $\lambda_1$ on signal line 84a is presented to signal lines 76a and 76b, the wavelength $\lambda_2$ on signal line 84b is presented to signal line 76b, the wavelength $\lambda_3$ on signal line 84c is presented to signal line 76b, and the wavelength $\lambda_4$ on signal line 84d is presented to signal line 76c. Thus signal line 76a connected to ONU 72a carries wavelength $\lambda_1$, signal line 76b connected to ONU 72b carries wavelengths $\lambda_1$, $\lambda_2$ and $\lambda_3$, signal line 76c connected to ONU 72c carries wavelength $\lambda_4$, and signal line 76d connected to ONU 72d carries no wavelengths.

The splitting of the signals in the digital optical switch matrix causes power losses. Thus the wavelength $\lambda_1$ on the signal line has at most half the power of the signal on signal line 84a. Similarly the wavelength $\lambda_1$ on line 76b has at most an eighth of the power of the signal on line 84a, the wavelength $\lambda_2$ on line 76b has at most a quarter of the power of the signal on line 84b, and the wavelength $\lambda_3$ on line 76b has at most half the power of the signal on line 84c. The wavelength $\lambda_4$ on line 76c has the full power of the signal on line 84d. One familiar with the art will know the effects on the signal power of the wavelengths switched through the digital optical switch matrix.

The thus selected wavelengths are presented to the ONUs 72 of the base transceiver stations 74. Each ONU 72 receives the respective signal line 76 at the input of the directional coupler 75. The directional coupler couples the received optical signal onto the signal line 86 connected to the optical receiver 76. The optical receiver 76 converts the optical signal into an electrical signal on line 38a.

On the downstream side the optical transmitter 78 receives the signal on line 40a from the antenna drive circuitry. The optical transmitter 78 converts the electrical signal on line 78 into an optical signal on line 88. The optical signal on line 88 is presented to the directional coupler 74 and coupled onto the signal line 76a.

The signal on line 76a from the ONU 72a is then routed through digital optical switch matrix and multiplexer/demultiplexer 80 in the reverse operation as that described above, and presented to the BSC 14 on optical fiber 16.

The upstream operation can be exemplified by tracing $\lambda 1$ backwards from the second port, on line 76b, at the right. The digital optical switches do not discern wavelengths, so given the switch positions shown in FIG. 6, $\lambda 1$ will enter the multiplexer/demultiplexer 80 at the ports 84a, 84b and 84c. Of those ports, only 84a will accept $\lambda 1$ because of the wavelength-selection inside the multiplexer/demultiplexer 80; thus this $\lambda 1$ signal will be guided from port 84a to the fiber 16. In principle the upstream wavelength thus needs to be the same as the downstream one. It can however also differ by a multiple of the so-called Free Spectral Range (FSR), when the transfer characteristics of the multiplexer/demultiplexer 80 have a periodic behavior versus wavelength with a period equal to this FSR. This periodicity is quite common for wavelength multiplexer/demultiplexer devices. The flexible wavelength router 73 provides a base station interface between the base station controller and the individual base stations (or base transceiver stations). The optical fiber 16 forms a central optical fiber, and the individual optical fibers 76 form local optical fibers. The flexible wavelength router 73 is programmable to select at least one communication channel, or wavelength, on the optical fiber 16 for communication to one of the base stations, or vice versa.

The flexible wavelength router 73 may be remotely programmable, via the router controller 70, for instance by the BSC.

The flexible wavelength router 73 may be located at any point in the wireless network where there is any optical split. For example, referring to FIG. 3, the flexible wavelength router 73 may be located at point 18 or points 20.

Thus FIG. 5 illustrates an improved wireless communications system which is reconfigurable to accommodate varying traffic density by using a shared flexible optical interface between a base station controller and several base stations. The improvements comprise a reduction of costs per base station (as many base stations share a flexible wavelength router and wavelength selection functions at the base stations are not needed or at least reduced), and easier maintenance (as the wavelength selection functions are now centralised in the flexible wavelength router and no longer located in many base stations). Communication between the base station controller and the:base stations is provided over an optical fiber. The fiber carries several communications channels in both directions using wavelength multiplexing. The bandwidth between the base station controller and a particular base station is varied by increasing or decreasing the number of wavelengths used to communicate with the base station. Also by carefully allocating the wavelength channels among the base stations, the number of base stations which share the resources of a wavelength channel can be varied, and thus the share of a particular base station can be adjusted to the capacity it requires. Varying the bandwidth provides the ability to adjust the capacity to carry voice and/or data between the base station controller and the base station. As a result the number of carrier frequencies assigned to a particular base station can be used to support varying traffic density throughout the wireless network.

Additionally, wavelength channels provide mutually independent communication channels, and as such may transport completely different signals. Thus in the same infrastructure it is possible to transport signals of widely differing formats, like GSM, ATM, and DECT. Also, different operators having licenses for different parts of the air spectrum may each have their dedicated wavelength channels in this infrastructure. By operating multiple wavelength channels, and providing their flexible assignment to the base stations, the network infrastructure is made extremely versatile for hosting a number of different wireless systems and operators, and for adapting the network structure quickly as traffic or network maintenance requires.

Figure 7:
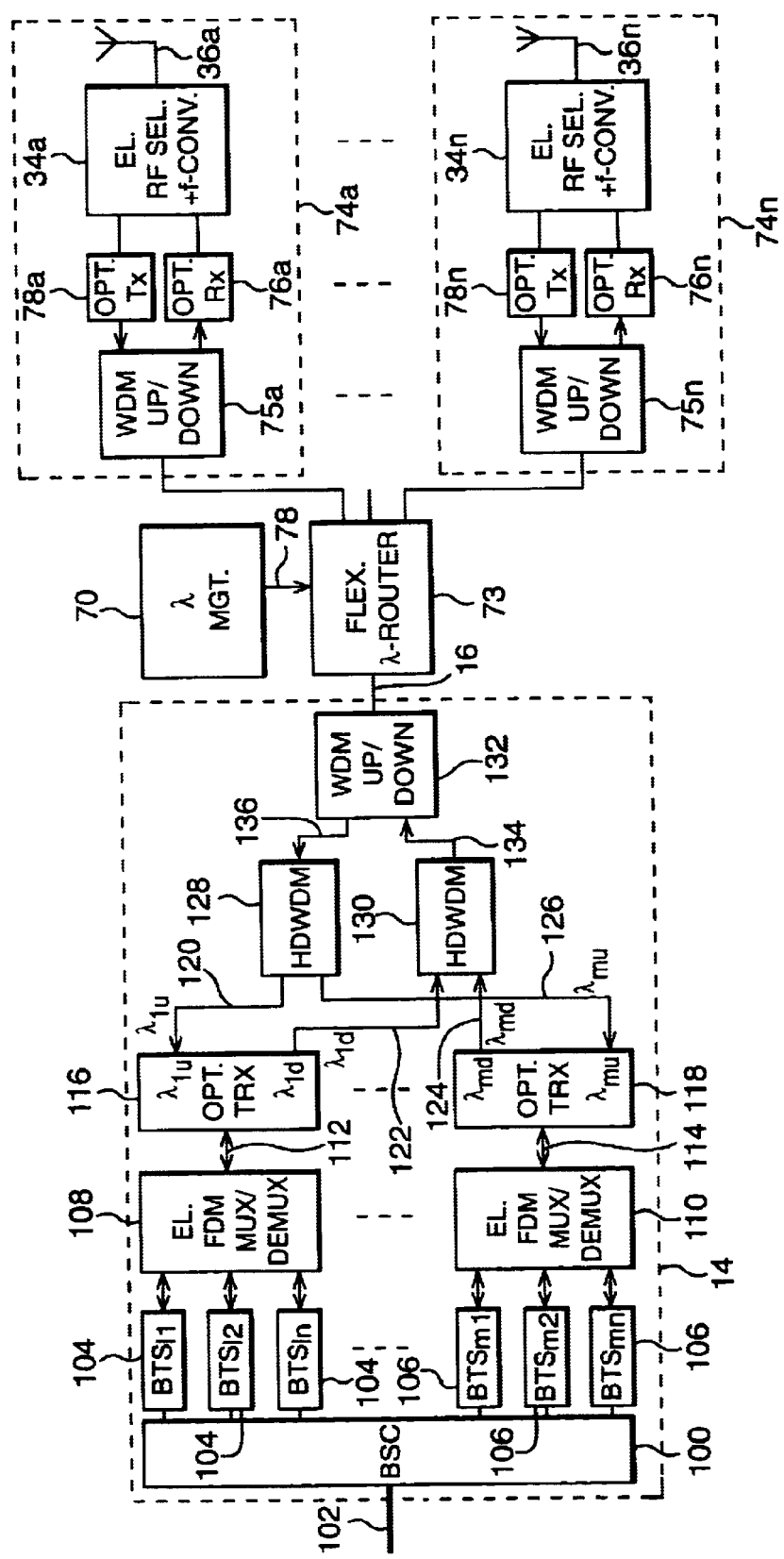
FIG. 7 illustrates one specific embodiment of the reconfigurable network of FIG. 5.

FIG. 7 shows a fuller implementation of the base station controller 14 in respect of which the invention was described with reference to FIG. 5, where the upstream/downstream separation is based on wavelength. In FIG. 7, like reference numerals denote like elements in FIG. 5.

Figure 7A:
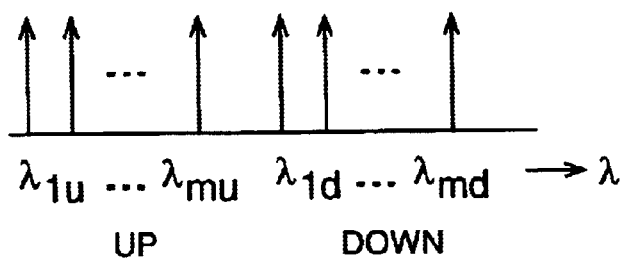

In the specific implementation of FIG. 7, the wavelengths $\lambda_{1u}$ to $\lambda_{mu}$ are available for use in the upstream and the wavelengths $\lambda_{1d}$ to $\lambda_{md}$ are available for use in the downstream. As shown in FIG. 7(a), these wavelengths are selected such that the downstream wavelengths are in a wavelength range which is separate from the upstream ones (e.g., this separation may be equal to a multiple of the FSR of the multiplexer/demultiplexer inside the flexible wavelength router 73).

The optical fiber directional couplers 75 are implemented by up/down multiplexer/demultiplexers 75. The microwave directional coupler 34a additionally includes the necessary circuitry to up-convert the signals for transmission by the antenna 36.

The base station transceiver 74a receives in the downstream direction signals, for example, of a wavelength $\lambda_{1d}$, plus additional downstream wavelengths as appropriate. The selection of the downstream wavelengths for each of the base transceiver stations 74 is made by the flexible wavelength router as described hereinabove.

The carrier frequency of the antenna 36a in the downstream will be e.g. the frequency $f_{1d}$ included in the wavelength channel $\lambda_{1d}$. Each wavelength channel may accommodate one or more carrier frequencies. If additional wavelengths are received, then the carrier frequencies included in those wavelengths will be present.

Referring to FIG. 7, in this preferred embodiment the base station controller 14 comprises a Base Station Controller (BSC) 100 which is connected to a core optical fiber 102 which is also connected to other base station controllers in the optical network. The base station controller 100, in this preferred embodiment, is connected to a set of base transceiver station functional blocks associated for each possible wavelength which may be forwarded to or received from the remote antenna locations 74a through 74n. In FIG. 7 there are shown n base transceiver station functional blocks 104 which are each associated with a first upstream wavelength $\lambda_{1u}$, and a first downstream wavelength $\lambda_{1d}$. Each one of the blocks 104 corresponds to one of the n base transceiver stations which the base station controller 100 controls. FIG. 7 also shows n base transceiver functional blocks 106, which are each associated with the mth upstream wavelength $\lambda_{mu}$ and the mth downstream wavelength $\lambda_{md}$. Each one of the blocks 106 similarly corresponds to one of the n base transceiver stations which the base controller station 14 controls.

The functionality provided by the various base transceiver station functional blocks 104, 106 is introduced into the base station controller by the implementation of the network where different wavelengths can be temporarily allocated to particular base stations. Previously, the functionality associated with these blocks would need to be incorporated at the antenna locations 74 themselves.

An electrical frequency multiplexer/demultiplexer is associated with each up and downstream wavelength. Thus the multiplexer/demultiplexer 108 is connected to the base transceiver functional blocks 104 by bi-directional signal lines 112. Similarly, the multiplexer/demultiplexer 110 is connected to the base transceiver functional blocks 106 by bi-directional signal lines 114. The respective multiplexer/demultiplexers 108, 110 are connected to respective optical transceivers 116, 118 by bi-directional signal lines 112, 114 respectively. Thus the electrical signal on line 112 is connected to the optical transceiver 116, and the electrical signal on line 114 is connected to the optical transceiver 118.

Each optical transceiver 116, 118 has an output for carrying the downstream signal, and an input for carrying the upstream signal. The optical transceiver 116 outputs the first downstream wavelength $\lambda_{1d}$ on line 122 to a downstream wavelength multiplexer 130. The optical transceiver 118 outputs the mth downstream wavelength $\lambda_{md}$ on line 124 to the downstream wavelength multiplexer 130. The optical transceiver 116 inputs the first upstream wavelength $\lambda_{1u}$, on line 120 from an upstream wavelength demultiplexer 128. The optical transceiver 118 inputs the first upstream wavelength $\lambda_{mu}$ on line 120 from the upstream wavelength demultiplexer 128.

The output of the downstream multiplexer 130 on line 134 is presented to an upstream/downstream multiplexer/demultiplexer 132. The upstream/downstream multiplexer/demultiplexer 132 presents an output on line 136 which form an input to the upstream demultiplexer 128. The upstream/downstream demultiplexer is also connected to the optical fiber 16.

In operation, on the downstream side, the BSC 100 controls the BTS functional blocks 104 associated with $\lambda_{1d}$, such that those blocks 104 associated with base transceiver stations to receive $\lambda_{1d}$ are enabled and the appropriate functionality performed.

The base transceiver blocks 104, 106 need to generate and receive the analogue RF signals going to and coming from the optically remote antenna locations. Also they need to perform several mobility-related functions, such as macrodiversity signal handling, which because of the mutual communication and synchronization required would be very beneficially done on a central location where all the BTSs are close to each other. This is the main advantage gained by putting the BTSs together, separate from the actual antenna sites. This has become possible with this concept, thanks to the broadband capabilities of optical fiber and the wavelength-multiplexing techniques proposed.

Signals at the frequency corresponding to $\lambda_{1d}$ are then output to the frequency multiplexer 108 from the appropriate blocks 104. The multiplexer 108 then multiplexes these frequencies onto signal line 112. This operation is repeated for all downstream wavelengths. The multiplexed electrical signals on line 112 are then converted into an optical signal having wavelength $\lambda_{1d}$ on line 122. The same is repeated for all downstream wavelengths. The downstream wavelengths $\lambda_{1d}$ to $\lambda_{md}$ are then multiplexed by multiplexer 130, and presented on signal line 134. The block 132 then couples the multiplexed downstream signal onto optical fiber 16.

In operation on the upstream side, the reverse operation is performed between the multiplexer block 132 and BSC block 100 to recover the transmitted signals.

Figure 8A:
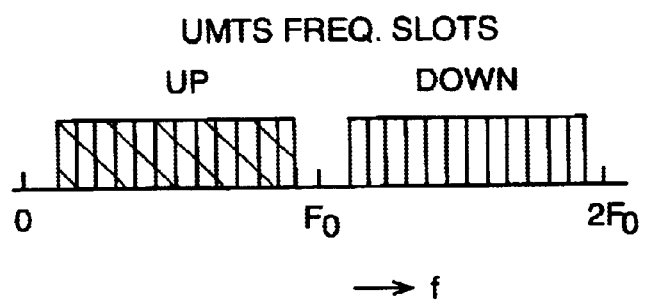
FIG. 8 illustrates a further specific embodiment of the reconfigurable network of FIG. 5.
Figure 8B:
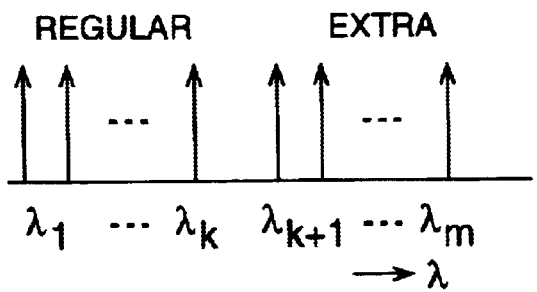
Figure 8:
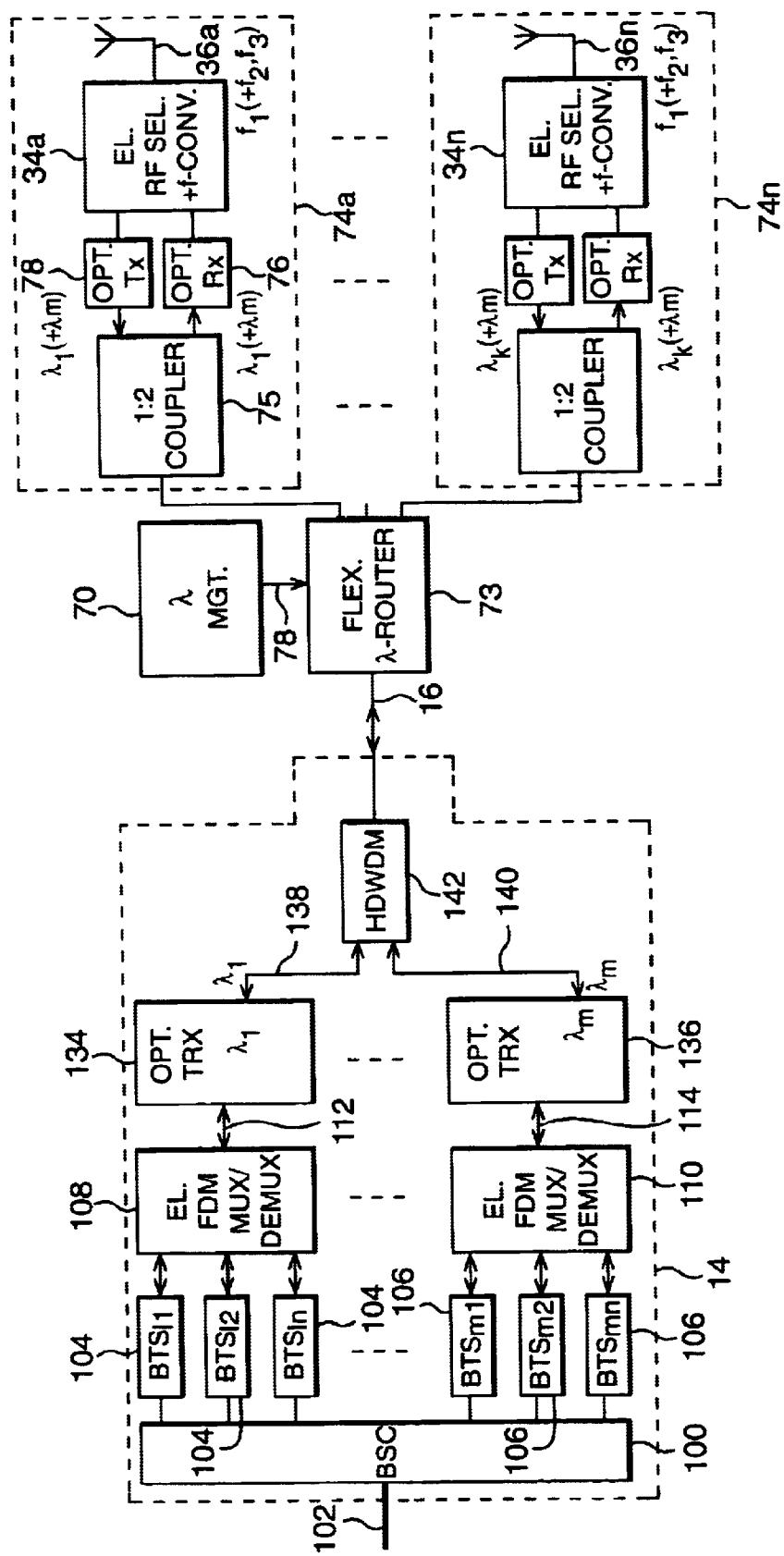

FIG. 8 illustrates a further example implementation of the present invention. As illustrated by FIG. 8(a), the upstream and downstream signals are transmitted on a single wavelength, but the wavelengths are frequency separated.

The implementation of the base transceiver stations 74 is simplified over the arrangement of FIG. 7, since the optical fiber directional coupler 75 need not be implemented by an optical wavelength multiplexer/demultiplexer.

Referring to FIG. 8(b), the wavelengths $\lambda_1$ to $\lambda_k$ carry the regular 5 MHz wide UMTS (Universal Mobile Telecommunications System) frequency slots, and the wavelengths $\lambda_{k+1}$ to $\lambda_m$ carry the extra 5 MHz wide UMTS frequency slots, flexibly to be assigned to hot-spot sectors.

The structure of the base controller station 14 is similar to that of the implementation of FIG. 7. However, the optical transceivers 116 and 118 of FIG. 7 are replaced by optical transceivers 134 and 136 which provide a bi-directional signal on lines 138 and 140 respectively. The multiplexer and demultiplexer 130 and 128 are replaced by a single multiplexer/demultiplexer which multiplexes the signal lines 138 and 140 to the optical fiber 16.

Both FIGS. 7 and 8 illustrate the shifting of the base transceiver station (BTS) functions (previously co-located with the antennas) to the central base station controller (BSC) location. This eases the implementation of mobility functions (like macro-diversity and seamless handover) where BTSs have to communicate with each other. It also implies the transport of the radio frequency (RF) analogue signals along the fiber network.

FIGS. 7 and 8 are both suitable for UMTS (Universal Mobile Telecommunications System) implementations.

Figure 9:
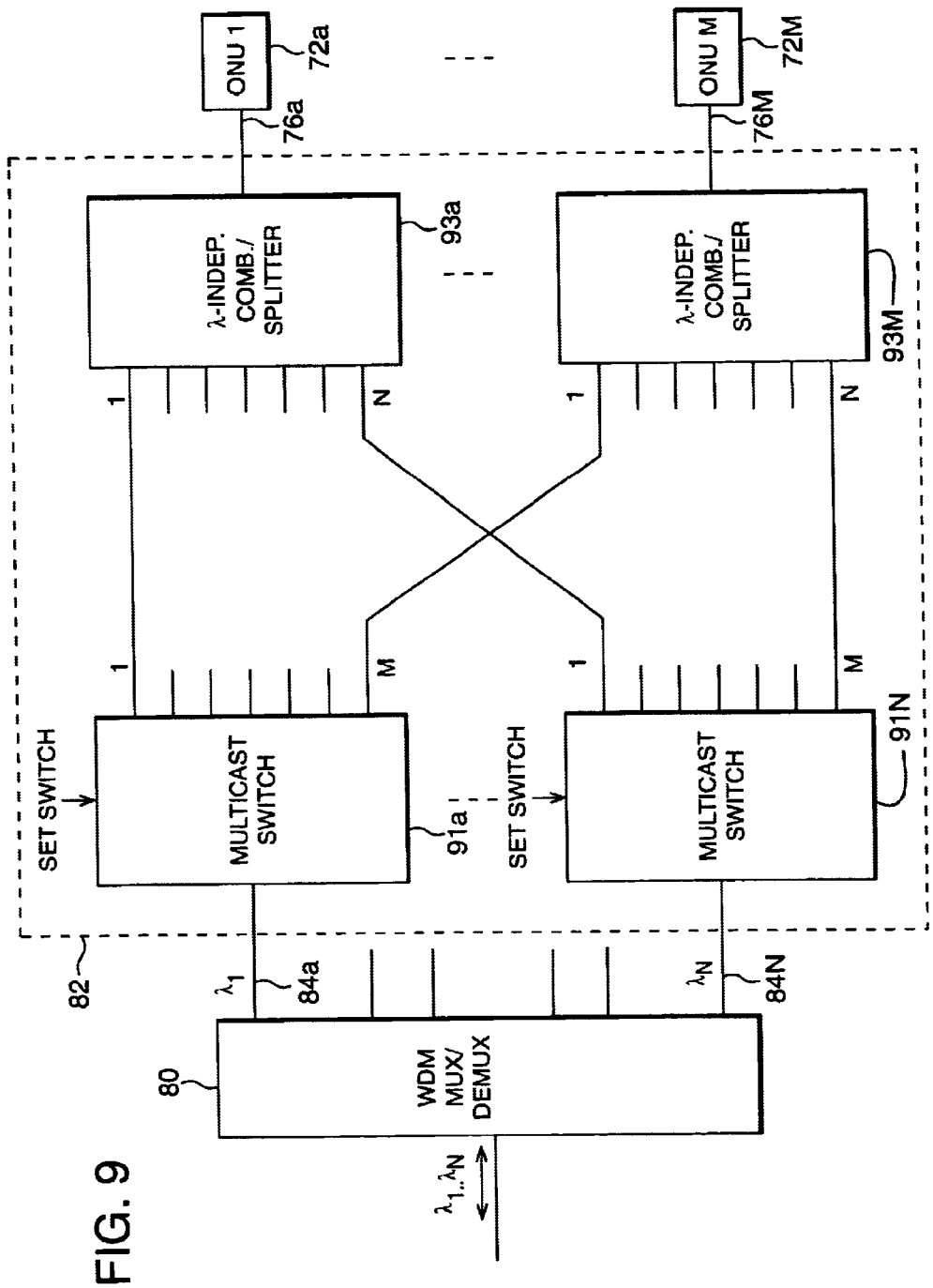
FIG. 9 illustrates a general schematic layout of the flexible wavelength router shown in FIG. 6.

FIG. 9 illustrates a general layout of the flexible wavelength router illustrated in FIG. 6. This structure shows a flexible wavelength router 82 intended to guide N wavelengths $\lambda_1$ to $\lambda_N$ to the M optical network units (ONUs)72a to 72 M. In practice, M needs to be larger than or equal to N. The multiplexer/demultiplexer places the wavelengths on the appropriate outputs 84. Each multicast switch 91 operates on a single wavelength channel $\lambda_i$ (i=1 to N), and guides this channel to one or more of its outlets. Each wavelength independent combiner/splitter 93 transfers all the received light signals coming from the switches to a single output fiber, leading to the corresponding ONU 72. Likewise the upstream light from each ONU is split by the wavelength independent combiner/splitter 93, and via the appropriately set multi-cast switches connected to the multiplexer/demultiplexer, which transfers it to the feeder fiber. The multiplexer/demultiplexer 80 may be implemented by well-known techniques such as waveguide grating routers. The wavelength independent combiner/splitter may be implemented with e.g. fused fibers or integrated optics branching waveguide devices. The multi-cast optical switch can be implemented with tri-state digital optical switches as exemplified in FIG. 6. The multi-cast switches may also be implemented by optical gates (which can be switched on or off). The optical gates may be implemented by semiconductor optical amplifiers, or with cascaded digital optical switches.

What is claimed is:

1. A wireless communication system comprising:

a base station controller;

a Flexible Wavelength Router connected to the base station controller by a central optical fiber; and a plurality base stations connected to the Flexible Wavelength Router, the central optical fiber carrying a plurality of communication channels each associated with an optical signal having at least one of a plurality of wavelengths, and the Flexible Wavelength Router selectively providing a communication path between the base station controller and at least one base station using at least one of the communication channels.

2. The wireless communication system of claim 1, wherein the at least one base station includes an optical interface, the at least one base station being connected to the Flexible Wavelength Router by a optical fiber.

3. The wireless communication system of claim 1, wherein the Flexible Wavelength Router provides a communication path between the base station controller and the at least one base station using a first set and a second set of communication channels, the first and second sets being associated with first and second service providers.

4. The wireless communication system of claim 3, wherein the Flexible Wavelength Router is programmable to select at least two of the plurality of communication channels as transmit channels, and to select at least two of the plurality of communication channels as receiver channels, wherein at least one transmit channel and at least one receive channel belong to the first set and wherein at least one transmit channel and at least one receive channel belong to the second set.

5. The wireless communications system of claim 3, wherein the receive channels are different than the transmit channels.

6. The wireless communication system of claim 3, wherein the first set of communication channels are associated with a first communication format and the second set of communication channels are associated with a second communication format.

7. The wireless communication system of claim 3, wherein the Flexible Wavelength Router comprises a digital optical switch.

8. The wireless communication system of claim 3, wherein at least some of the base station functionality is performed at the base station controller.

* * * * *